(12) United States Patent
Salvino

(10) Patent No.: US 8,978,547 B2
(45) Date of Patent: Mar. 17, 2015

(54) COOKING ASSEMBLY

(76) Inventor: L. Paul Salvino, Wauconda, IL (US)

( * ) Notice: Subject to any disclaimer, the term of this patent is extended or adjusted under 35 U.S.C. 154(b) by 81 days.

(21) Appl. No.: 13/082,903

(22) Filed: Apr. 8, 2011

(65) Prior Publication Data

US 2012/0258224 A1    Oct. 11, 2012

(51) Int. Cl.
*A47J 27/05*    (2006.01)
*A47J 37/10*    (2006.01)

(52) U.S. Cl.
CPC ............... *A47J 37/108* (2013.01); *A47J 27/05* (2013.01)
USPC ..................... 99/418; 220/573.3; 220/573.4

(58) Field of Classification Search
CPC ......... A47J 37/108; A47J 37/10; A47J 36/34; A47J 27/05; A47J 27/10; A47J 27/60
USPC ............. 220/912, 573.1, 573.3, 573.4, 573.5, 220/574, 574.2, 574.3, 756, 23.88, 23.89; 206/499–503, 505–507, 509, 510; 126/390.1; 99/446, 425, 415, 410, 413, 99/417, 422
See application file for complete search history.

(56) References Cited

U.S. PATENT DOCUMENTS

| | | | | |
|---|---|---|---|---|
| 746,213 A * | 12/1903 | Wentzel | ...................... | 220/573.4 |
| 1,268,017 A * | 5/1918 | Knight | ...................... | 220/573.4 |
| 1,753,895 A * | 4/1930 | Larson et al. | .................... | 99/422 |
| 1,899,682 A * | 2/1933 | Goldenberg | .................... | 99/445 |
| 2,628,738 A * | 2/1953 | Hilldale | ........................ | 220/522 |
| 5,422,076 A * | 6/1995 | Jones | ............................. | 600/574 |
| 5,662,026 A * | 9/1997 | Prakasa | ........................... | 99/413 |
| 5,957,038 A * | 9/1999 | Shimazaki | ...................... | 99/340 |
| 6,000,319 A * | 12/1999 | Treiber | ........................ | 99/449 |
| 6,167,799 B1 * | 1/2001 | Macias | ........................... | 99/413 |
| 6,360,654 B1 * | 3/2002 | Cornfield | ....................... | 99/339 |
| 7,228,792 B2 * | 6/2007 | Crawford et al. | ............... | 99/400 |
| 7,389,721 B2 | 6/2008 | Wanat | | |
| 7,617,948 B2 * | 11/2009 | Cheng | ........................ | 220/573.1 |
| 8,123,067 B2 * | 2/2012 | Thomson | ................... | 220/573.5 |
| 8,272,531 B2 * | 9/2012 | Cuillery et al. | ............ | 220/573.1 |
| 2008/0206437 A1 * | 8/2008 | Perry | ............................. | 426/614 |

* cited by examiner

*Primary Examiner* — Andrew Perreault
(74) *Attorney, Agent, or Firm* — Kelly & Krause, LP; W. Dennis Drehkoff

(57) ABSTRACT

An improved cooking assembly and method is disclosed. The assembly includes a base pan for heating and boiling water. An inner pan is suspended or elevated above the base pan via a support member. Ideally, the support member allows water to flow over, under, or through it. A lid is disposed over the base pan, and a gap remains between the rim of the inner pan and the base pan. Optionally, the handle of the inner pan fits into a notch in the rim of the base pan to lock it into place, and a projection may extend from the handle of the inner pan to a receiving member in a handle of the base pan. The lid may be extended using a free-standing peripheral extender or an extender wall about the lid. Optionally, a grill may be placed on the inner pan, or poaching pans may be placed in the inner pan. Water is heated and transformed to steam. The steam is allowed to condense on the interior concave surface of the lid, and condensed water then streaks down the lid toward the outside edge. In this manner, food is cooked evenly without any of the problematic effects of burning.

14 Claims, 4 Drawing Sheets

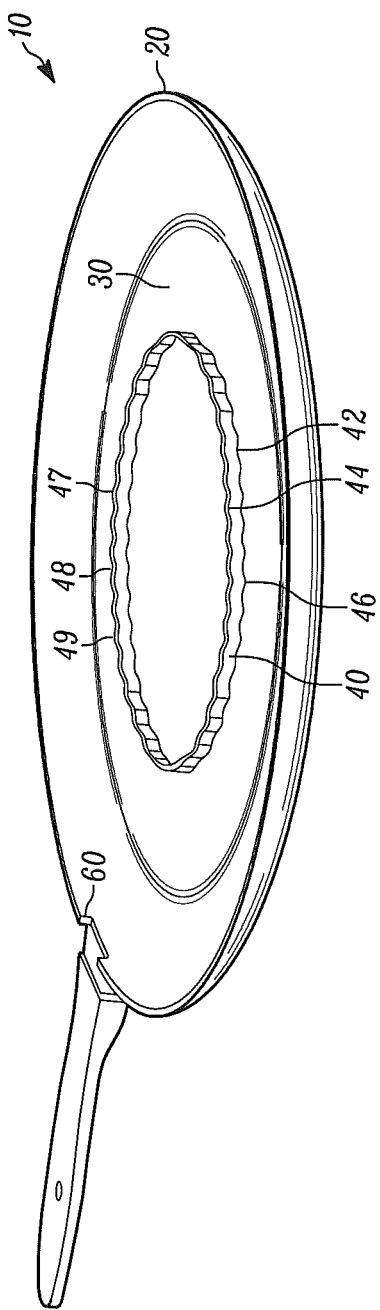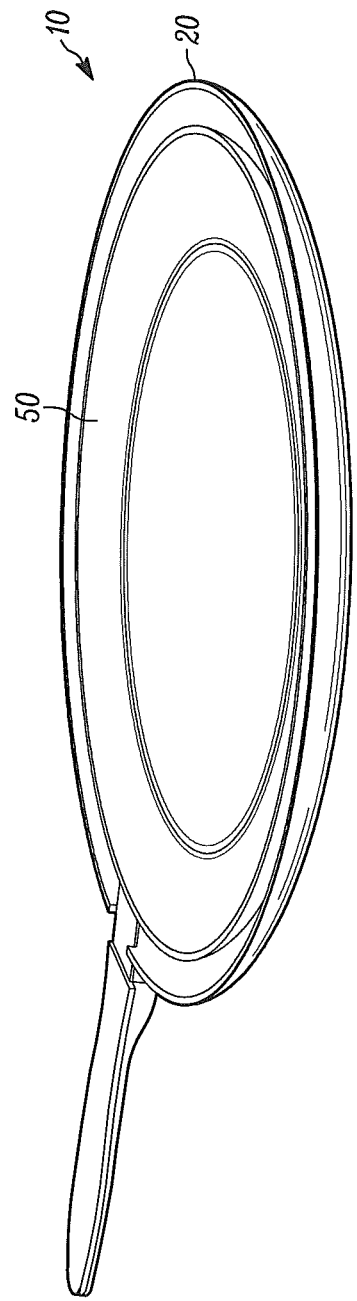

COOKING ASSEMBLY

BACKGROUND OF THE INVENTION

1. Field of the Invention

The present invention relates to a cooking assembly, and more particularly, to a cooking assembly with an improved configuration for healthy food preparation.

2. Background

Preparation of food in various ways stems far back into human pre-history. People have used heat to prepare foods since the advent of controlled fire. Various forms of cookware and methods of heating food are conventionally used and well known.

Some methods of food preparation include grilling food, or exposing food to flame. Other methods include using cookware which is heated directly. However, it has become well-known that burning or browning food, as results from more direct heating, can introduce carcinogens. Thus, such methods are not ideal, and may be harmful to health.

Another known method of preparing certain foods is steaming. Conventional steaming cookware involves a bottom pot which holds and heats water, and a top pot having holes in its bottom surface which contains the food items intended to be cooked. Steam rising up through the holes heats the food items. However, grease and fat from various food items runs down through these holes, and is then recycled back upward toward the food.

U.S. Pat. No. 7,389,721, issued to Wanat, for example, discloses such a system in which heated water is boiled and steam rises through holes in a pot which holds food. The fats and greases in various food items is allowed to spill into the water, and in turn is recycled into the water. Furthermore, important nutrients in various food items seeps out of the food items and is lost into the water through the holes.

While this, and various other processes may be known, currently, there is no optimal manner in which to prepare food in cookware. Thus, there continues to be a need for an improved cookware assembly for healthy and optimal food preparation.

SUMMARY

The present invention is a cookware assembly and method. The cookware assembly of the present invention allows for improved food preparation which is both healthy and more optimal.

The improvements of the present invention include at least the following. Food items are not placed directly on a directly heated surface. Instead, food items are placed on a surface which is not directly heated. Water is heated in a base pan underneath the surface on which the food is placed. The water is boiled and steam then rises through a side gap and evenly heats the food items without burning or browning. Nutrients in food items are not lost because the surface on which they are placed does not include holes. Steam is condensed back to water upon the interior surface of the lid of the assembly, and is allowed to run down toward the outer edges and is recycled back down to the water being heated in the bottom pan.

The cookware assembly, thus, includes a bottom base pan. Water is placed in the base pan. A support member is placed on the bottom surface of this base pan. The support member may be a heat transfer coil. The support member ideally is shaped to allow water to pass below, above, or through it. The support member supports an inner pan which is placed upon it. This inner pan is heated by the water below it and the support member, however, it is not directly exposed the heat source.

Ideally, water heated in the base pan can pass freely through, above, or below the support member. Boiled water in the form of steam rises through the gap between the inner and base pans. The food items in the inner pan are heated evenly without burning or browning, and without substantial loss of nutrients.

In various embodiments, the cookware assembly includes a lid with a concave interior surface. Either a lid having a vertical extension member, or a stand-alone vertical wall allows for more space for larger food items. A grill can be placed in the inner pan. Alternatively, poaching pans can be placed in the inner pan.

Furthermore, in various embodiments, the inner pan may have a handle which helps to lock it into place with respect to the base pan. For example, a notch in the edge of the base pan may hold the handle into place to prevent it from rotating, and a projection from the inner pan handle downward may lock into place with a receiving opening within the handle of the base pan, which can be used to prevent radial movement of the inner pan with respect to the base pan.

Still other objects and advantages of the present invention will become readily apparent to those skilled in the art from the following detailed description, wherein it is shown and described only the preferred embodiments of the invention, simply by way of illustration of the best mode contemplated of carrying out the invention. As will be realized, the invention is capable of other and different embodiments and its several details are capable of modifications in various obvious respects, without departing from the invention. Accordingly, the drawings, wherein like reference numerals represent like features, and description are to be regarded as illustrative in nature and not as restrictive.

BRIEF DESCRIPTION OF THE DRAWINGS

FIG. 1 shows an elevated perspective view of the base pan and support member of one embodiment of the present invention.

FIG. 2 shows an elevated perspective view of the inner pan supported within the base pan of one embodiment of the present invention.

DETAILED DESCRIPTION OF THE INVENTION

Figure 3:
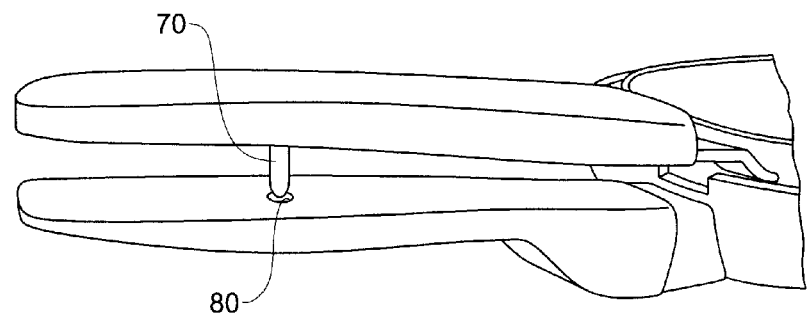
FIG. 3 shows a side view of the handle arrangement of one embodiment of the present invention.
Figure 4:
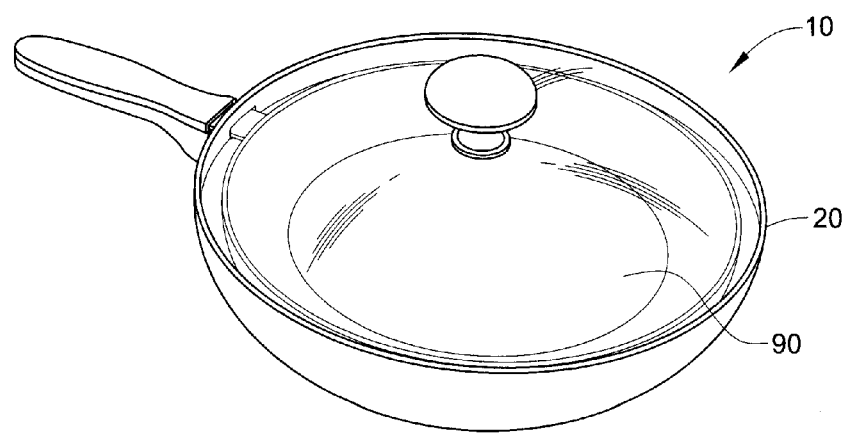
FIG. 4 shows an elevated perspective view of the pans with the lid according to one embodiment of the present invention.
Figure 5:
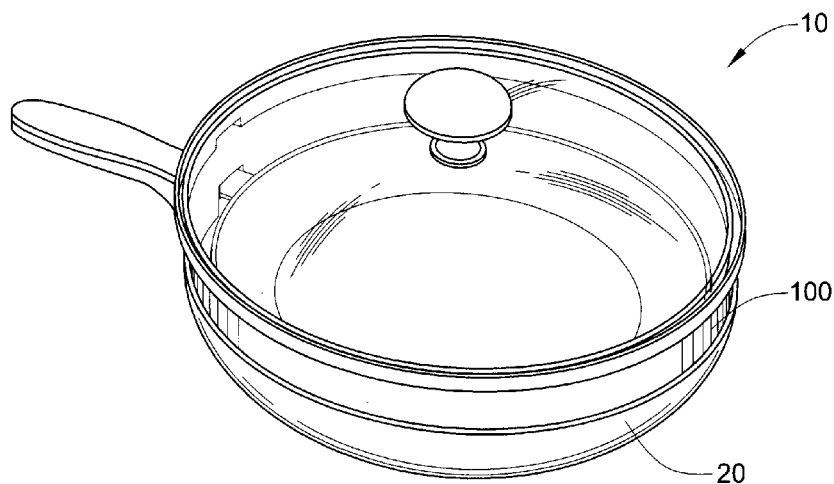
FIG. 5 shows an elevated perspective view of another embodiment of the present invention.
Figure 6:
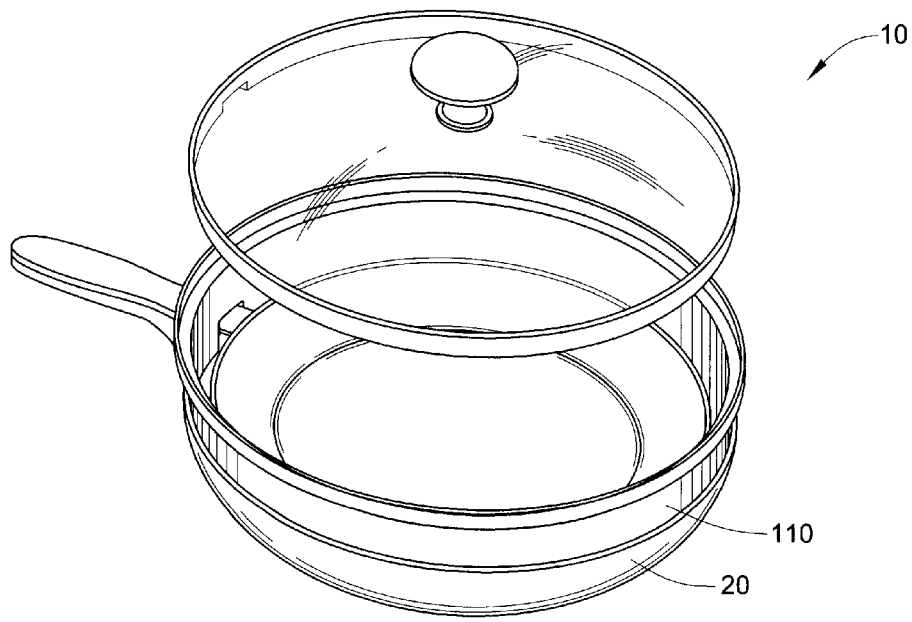
FIG. 6 shows an elevated perspective view of another embodiment of the present invention.
Figure 7:
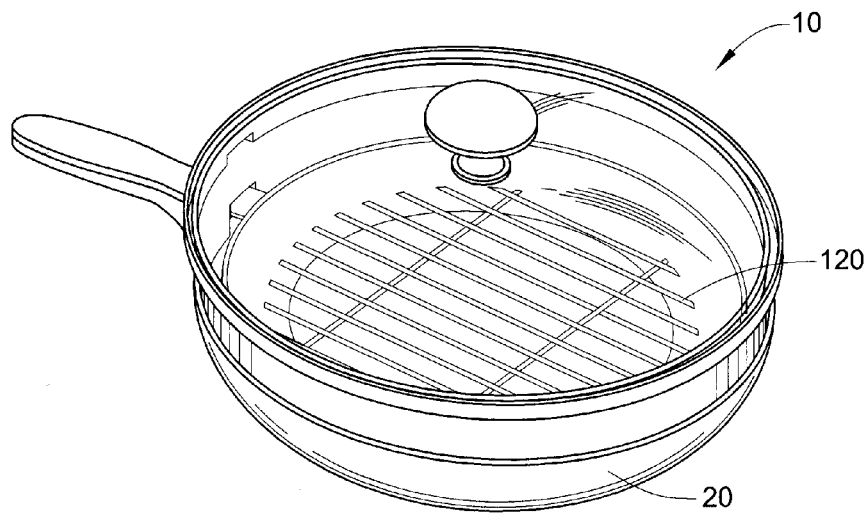
FIG. 7 shows an elevated perspective view of another embodiment of the present invention showing a grill.
Figure 8:
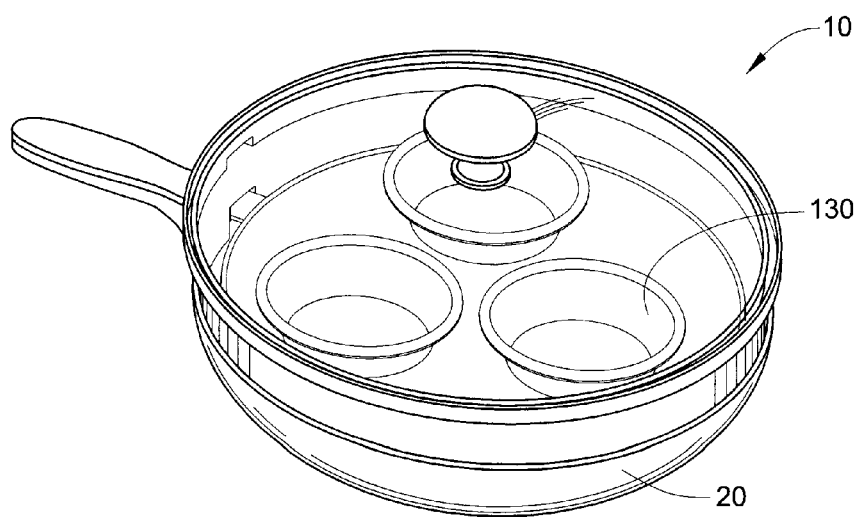
FIG. 8 shows an elevated perspective view of another embodiment of the present invention showing poaching pans.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

The present invention is a cooking assembly 10 for improved preparation of food. The assembly 10 includes a base pan 20 having an interior surface 30. The pan is ideally a metal pan, of any suitable material. A support member 40 holds the inner pan 50 in spaced relation above the base pan 20. Any number of support member configurations are possible to hold the inner pan 50 above the interior surface of the base pan 20. In certain embodiments, the support member 40 may be adapted to be placed upon the interior surface 30 of said base pan 20.

The support member 40 may be any suitable configuration which will support an inner pan 50 above the base pan 20. In certain ideal embodiments, the support member 40 may be a heat coil which can transfer heat from the bottom of the base pan 20 to water in the pan 20, and to some extent also to inner pan 50. Optionally, the support member 40 may be configured to allow water to pass above, below, or through it. Preferably, support member 40 has an annular, continuous sidewall 42 with top 44 and bottom 46 edges. Both edges are notched or toothed, for example, with notched members 47. Openings 48 positioned between points 49 of the notched members are positioned to allow the passage of water therethrough while support member 40 supports inner pan 50. Continuous sidewall 42 need not be annular for it may be any configuration that adequately supports base pan 50.

The inner pan 50 is placed upon the support member 40 and held separated from the base plan 20. Ideally, inner pan 50 has a solid continuous bottom surface free of holes. A gap surrounding the inner pan 50 allows steam to rise between the pans 20 and 50. Optionally, a notch 60 in the edge rim of base pan 20 allows the handle of the inner pan 50 to be held into place. This prevents inner pan 50 from rotating with respect to base pan 20. A projection 70 from the inner pan handle optionally fits into a receiving opening 80 in the base pan handle to prevent radial movement of the inner pan 50 with respect to the base pan 20.

A lid 90 is placed atop the base pan 20, in various embodiments. The lid 90 ideally has a concave interior surface, an optionally may have a handle or knob for handling. Thus, steam can condense on the concave interior surface, and condensed water streaks down toward the outer edges of the lid to fall back down into the base pan 20. In certain embodiments, the lid may include a vertical peripheral extension 100 extending from an upper portion of a perimeter of the lid downward. The vertical peripheral extension 100 is adapted to interface with the base pan 20 along its perimeter. Thus, steam accumulating on said concave interior surface condenses and streaks down to the edge of the lid. This extension 100 may be integral with lid 90.

In other alternate embodiments, a stand-alone peripheral extender 110 may be placed atop the edge of the rim of the base pan 20, and the lid 90 placed on top of the extender 110. In this manner, larger food items may be placed within the assembly 10. The peripheral extender 110 optionally may include handles for ease of handling.

In certain other embodiments, a grill 120 may be disposed above the inner pan 50. This allows for a variety of food items to be placed atop the grill and cooked evenly, allowing grease or fat to drip into the inner pan 50. Ideally, the grill is elevated above the inner pan 50.

In other embodiments, poaching pans 130 may be placed within the inner pan 50. Thus, items such as eggs may be cooked within them.

The method of cooking food items using the present invention includes disposing food items to be cooked within the inner pan 50. The inner pan 50 is suspended or elevated above the interior surface of the base pan 20 using a support member 40. The base pan 20 is covered with the lid 90, and water is heated in the base pan 20.

In certain embodiments, the method includes allowing water to flow over, under, or through the support member 40. Water is boiled in the base pan 20 and steam is allowed to rise around the inner pan 50, and condenses on the lid 90.

In this manner, a large variety of food items may be cooked by evenly heating them without browning or burning portions of the food items. The cookware assembly 10 can be configured to any of its preferred embodiments to optimize it for the desired food item. I healthier result is obtained.

While specific embodiments have been illustrated and described, numerous modifications come to mind without significantly departing from the spirit of the invention and the scope of protection is limited by the scope of the accompanying claims.

What is claimed is:

1. A cooking assembly for improved preparation of food comprising:
   a base pan having an interior surface,
   an inner pan having a continuous bottom surface
   a support member having a continuous sidewall with top and bottom edges, the top and bottom edges including notched members, which allow water to flow over and under the top and bottom edges respectively, and through the notched members of the continuous side wall, wherein the inner pan is disposed upon the support member and the notched members of the top edge of the support member contact the continuous bottom surface of the inner pan; and
   said inner pan is disposed above and in spaced relation to the interior surface of said base pan, with a circumferential gap between a rim of said base pan and a rim of said inner pan.

2. The cooking assembly for improved preparation of food according to claim 1, wherein said support member is a heat transfer element for transferring heat from said base pan to water disposed within said inner pan.

3. The cooking assembly for improved preparation of food according to claim 1, wherein said inner pan has a perimeter spaced inwardly from a perimeter of said base pan.

4. The cooking assembly for improved preparation of food according to claim 3, wherein said inner pan includes a handle extending radially outward from the perimeter of said inner pan.

5. The cooking assembly for improved preparation of food according to claim 4, wherein said base pan includes a receiving notch in its edge adapted to receive a portion of the handle of said inner pan, wherein said inner pan is prevented from rotating about its center when its handle is nested within said notch.

6. The cooking assembly for improved preparation of food according to claim 3, further comprising a lid having a concave interior surface adapted to interface with said base pan along its perimeter, wherein steam accumulating on said concave interior surface condenses and streaks down to the edge of said lid.

7. The cooking assembly for improved preparation of food according to claim 6, further comprising a lid having a concave interior surface, wherein said lid comprises a vertical peripheral extension extending from an upper portion of a perimeter of said lid downward, and wherein said vertical peripheral extension interfaces with said base pan along its perimeter, wherein steam accumulating on said concave interior surface condenses and streaks down to the edge of said lid.

8. The cooking assembly for improved preparation of food according to claim 3, further comprising a peripheral extender placed on a rim of said base pan and extends upward therefrom around substantially an entire perimeter of said base pan, said peripheral extender further interfaces with a lid edge of a lid having a concave interior surface resting above said peripheral extender.

9. The cooking assembly for improved preparation of food according to claim 7, further comprising a grill elevated above a bottom interior surface of said inner pan.

10. The cooking assembly for improved preparation of food according to claim 8, further comprising a grill elevated above a bottom interior surface of said inner pan.

11. The cooking assembly for improved preparation of food according to claim 6, further comprising at least one poaching pan disposed within said inner pan.

12. The cooking assembly for improved preparation of food according to claim 7, further comprising at least one poaching pan disposed within said inner pan.

13. The cooking assembly for improved preparation of food according to claim 8, further comprising at least one poaching pan disposed within said inner pan.

14. The cooking assembly for improved preparation of food according to claim 5, where the handle of said inner pan comprises a projection extending downward therefrom, and wherein a handle of said base pan comprises a receiving member operatively associated with a portion of said projection wherein said inner pan is substantially prevented from moving radially with respect to said base pan when said projection is received within said receiving member.

\* \* \* \* \*